United States Patent [19]

Daniels et al.

[11] 3,723,850

[45] Mar. 27, 1973

[54] HIGH VOLTAGE POWER SUPPLY FOR COPYING APPARATUS OR THE LIKE

[75] Inventors: Charles R. Daniels; Kenneth D. Kinzer, both of Huntington, Ind.

[73] Assignee: Ferromagnetics, Inc., Columbia City, Ind.

[22] Filed: July 23, 1971

[21] Appl. No.: 165,653

[52] U.S. Cl. ........................................321/47, 321/15
[51] Int. Cl. ..............................................H02m 7/42
[58] Field of Search ......307/110; 321/15, 47; 323/61

[56] References Cited

UNITED STATES PATENTS

| | | | |
|---|---|---|---|
| 2,628,338 | 2/1953 | Gould | 321/15 |
| 2,694,163 | 11/1954 | Sola | 323/61 |
| 2,985,812 | 5/1961 | Peterson | 321/15 |
| 2,873,409 | 2/1959 | Most | 321/15 X |
| 3,121,835 | 2/1964 | Diebold | 321/15 |
| 3,355,639 | 11/1967 | Semenhuk | 321/15 X |
| 3,526,821 | 9/1970 | Thomas | 321/15 X |

Primary Examiner—William M. Shoop, Jr.
Attorney—Richard D. Wyss et al.

[57] ABSTRACT

An unusually compact and efficient high voltage power supply of the saturable-core and resonant-secondary type is achieved by combining a high voltage secondary winding and a resonant-secondary winding into one relatively efficient yet relatively low voltage secondary winding and by coupling this secondary winding to a voltage doubling rectifier circuit. A high voltage capacitor is used to extract a high voltage alternating current signal from this same secondary winding so that a peak D.C. output voltage whose magnitude is 1½ to 2 times the peak-to-peak A.C. output voltage of the secondary winding may be achieved. By eliminating the need for multiple windings, this power supply can compact all of its elements, including the rectifier circuit, into a space that is substantially smaller than the space occupied by the transformer alone of a conventional power supply.

18 Claims, 6 Drawing Figures

Patented March 27, 1973

3,723,850

INVENTORS:
CHARLES R. DANIELS
KENNETH D. KINZER

BY Mason, Kolehmainen
Rathburn & Wyss
ATTORNEYS

HIGH VOLTAGE POWER SUPPLY FOR COPYING APPARATUS OR THE LIKE

This invention relates to the design of high voltage, direct current power supplies and more particularly to the design of such supplies for use in electrostatic copiers, dust precipitators, and other devices requiring regulated output voltages which do not have to be completely free from alternating current ripple.

In the field of electrostatic copying, it is necessary to generate positive and negative voltages whose magnitudes are 4,000 to 8,000 volts to either side of ground for use in applying a charge to an image recording surface. A power supply designed for use in a copying machine does not require elaborate means for suppressing the A.C. ripple in the supply output because the development of a charge in the image recording surface is mainly responsive to the peak direct current voltages developed at the power supply output. In practice, it is found that having large amounts of ripple in the supply output can terminate arcs before damage to the image recording surface results, and can therefore be beneficial. Due to the close spacing which must be maintained between the image recording surface and the charging electrodes, it is important that the peak D.C. voltages which are developed by such a power supply be carefully regulated. Too low a peak D.C. voltage can result in insufficient charges being developed, and too high a peak D.C. voltage can cause a breakdown of the air between the charging electrodes and the image recording surface and can result in arcing. The charging process also draws a fairly substantial current from such a power supply, and this current drain must not seriously alter the power supply peak D.C. output potential.

In the past, power supplies have generally been designed around a transformer having a resonant, saturable secondary. Typically, a rectangular transformer core having a ⅞ inch thick stack of laminations has been used. Upon this core is placed a primary wound from a large number of turns of relatively heavy gage copper wire. To hold down the physical size of the transformer, this primary winding is usually formed as two separate and serially connected sections residing on opposite legs of the transformer core. Two relatively bulky secondary windings are also placed upon the core and are placed on opposing legs of the core again to hold down the physical size of the transformer. The first secondary is wound from a small number of turns and is connected to a resonating capacitor. The second secondary is wound with a larger number of turns and serves as the high voltage secondary output winding of the transformer. A stack of laminations is inserted into the transformer to partially separate the magnetic flux paths of the primary and secondary windings so that the resultant transformer has a figure-eight configuration. The output of the second secondary winding is fed to a voltage doubling rectifier circuit which produces an output voltage that approximately equals the peak-to-peak A.C. voltage developed by the secondary. If 9,000 volts is to be developed at the supply output, the filter capacitors used in the rectifier must have a 4,500 volt rating and the rectifier diodes must be rated to withstand a peak inverse voltage of 9,000 volts. The second secondary winding must develop 9,000 volts peak-to-peak. Regulation is achieved by resonance of the first secondary winding which saturates the secondary flux path and stabilizes the potential developed across both of the secondary windings.

The main difficulty with prior art structures of this type is their bulk. The transformer itself is quite thick and includes four bulky copper windings. The rectifiers and capacitive elements are mounted externally to the transformer and must be designed to withstand high voltages. By the time shielding is added to cover the externally mounted rectifier components, the entire power supply assembly comes close to matching one-half of a brick both in size and in weight. Considerable power is lost in the copper windings. The large number of windings and the bulky transformer core are required to overcome these loses and to supply sufficient output current for use in copying. Prior attempts to combine the secondary windings have failed because a winding capable of delivering a suitable output voltage contains too many turns of wire to serve properly in a high-Q resonant circuit which must saturate the transformer secondary with minimal drive. All prior art power supplies have therefore been constructed with two secondary windings, one for resonance and a separate one for developing an output voltage.

A primary object of the present invention is to design a more compact, lighter, and less expensive high voltage power supply that is able to supply the necessary high voltages for copying operations and that is also able to provide good regulation.

Another object of the present invention is to make is possible to have a power supply which does not require extremely high voltage rectifying components.

An additional object of the present invention is to provide a power supply having fewer windings which may be constructed using smaller diameter copper wire.

A further object is the production of a transformer assembly which is so compact that the rectifier components may be mounted about the transformer between the windings and the core so that the entire supply is no more bulky than the transformer and its windings, and so that the entire power supply may be impregnated into an epoxy casing that is smaller than the transformer alone of a conventional power supply.

In accordance with these and other objects, an embodiment of the present invention comprises in brief a transformer which is constructed around a stack of laminations that is less than two-thirds the thickness of the stack in a conventional power supply. This transformer has a single primary winding having only two-thirds the turns of the primary winding in a conventional supply and located entirely on one leg of the transformer. The transformer has a single secondary winding again positioned on just one leg of the transformer. In the space where prior art transformers had additional windings, the present invention places all the additional components needed for rectifying and for filtering of the output voltage so that all of the power supply components are included within the smallest rectangular solid which can encompass the transformer and its windings. The resultant transformer structure weighs far less than prior art power supplies and occupies only about one-third of the volume occupied by such prior art supplies.

The single secondary winding is capable of generating an output voltage, illustratively 6,000 volts peak-to-peak. This secondary winding is equipped with a high voltage ceramic resonating capacitor and thus serves as a resonant circuit which saturates the secondary flux path of the transformer. The voltage developed by this resonant secondary circuit is considerably larger than that developed by the resonant secondary circuits used in prior art power supplies but is still low enough so that the resistance in the secondary winding does not interfere markedly with the resonance.

To this secondary winding is attached a conventional voltage doubling rectifier circuit constructed from two diodes having 6,000 volt peak-inverse-voltage ratings and two capacitors having 3,000 volt ratings. The rectifier D.C. output voltage is typically developed between ground and a terminal that is held 6,000 volts positive or negative with respect to ground. A second output voltage from the supply is then developed by a capacitor which connects to a terminal of the transformer secondary that presents a 6,000 volt peak-to-peak alternating current waveform with respect to ground. The capacitor output swings between plus and minus 3,000 volts and gives the power supply a peak output voltage of 9,000 volts. If a higher peak output voltage is desired, an external diode may be connected between this capacitor output and ground. The external diode boosts the peak supply output voltage to 12,000 volts.

The resultant power supply is far more efficient than prior arrangements due to the fact that there are loses in only one secondary winding instead of in two such windings. Primary winding loses are also reduced due to a reduction in the primary current levels. Increased transformer efficiency allows the desired output voltage to be developed with a smaller transformer stack of laminations and with a lighter weight transformer primary winding than has heretofore been practicable. The lower voltages developed in the rectifier circuit allow less expensive rectifiers and capacitors to be used in the construction of the rectifier circuit without any sacrifice in the quality of the supply.

Further objects and advantages of the present invention are apparent in the detailed description which follows. The points of novelty which characterize the invention are defined with particularity in the claims appended to and forming a part of the specification.

For a better understanding of the invention, reference is made to the drawings wherein.

Figure 1:
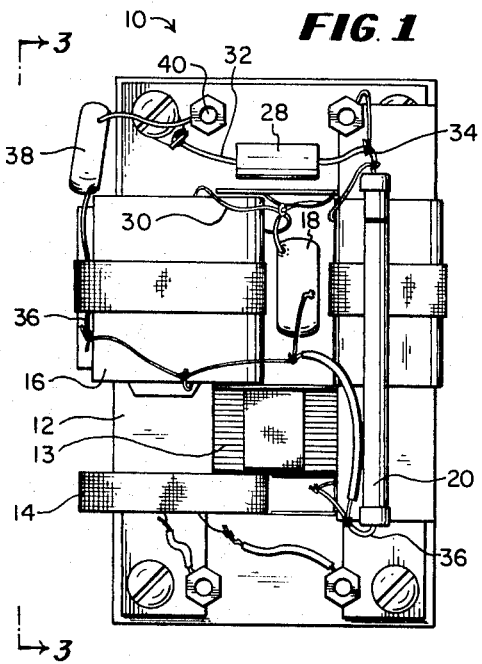
FIG. 1 is a plan view of a power supply constructed in accordance with the present invention.
Figure 2:
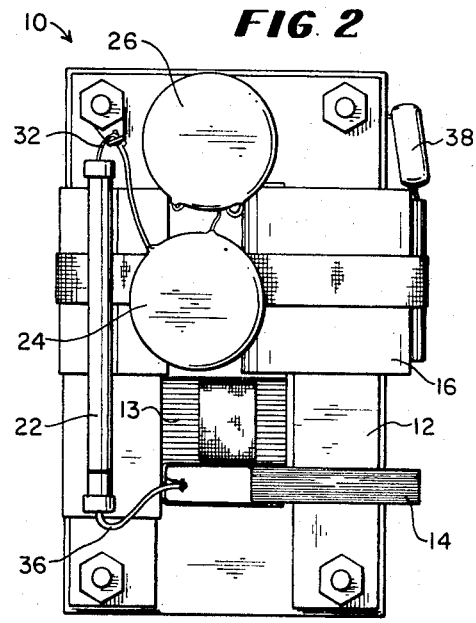
FIG. 2 is the power supply shown in FIG. 1 as seen from the reverse side of the supply.
Figure 3:
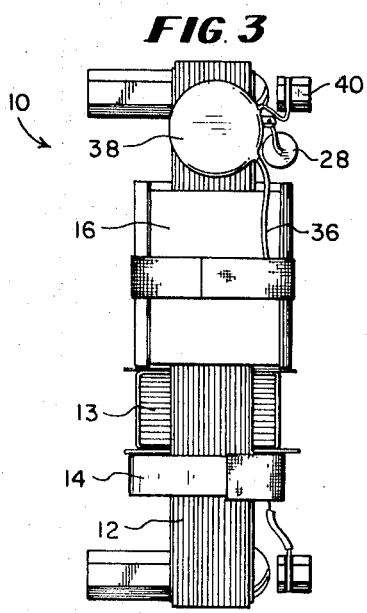
FIG. 3 is a side view of the supply shown in FIG. 1 when viewed in the direction of the arrows 3—3 in FIG. 1.

A power supply designed in accordance with the teachings of the present invention is shown in FIGS. 1 through 4 and is indicated generally by the reference number 10. The supply 10 includes a rectangular transformer core 12 that is constructed from a 9/16 inch thick stack of laminations. By way of comparison, the stack of laminations required by a conventional power supply would be seven-eighths of an inch thick—more than 50 percent thicker. A primary winding 14 encircles the transformer core 12 at one end thereof, and a secondary winding 16 encircles the transformer core 12 at the opposite end thereof. With reference to FIGS. 1 to 3, an approximately ½ inch stack of laminations 13 provides a magnetic path between the sides of the transformer 12 and creates separate magnetic circuits for the primary winding 14 and for the secondary winding 16. The primary winding 14 is typically connected to an unregulated 90 to 120 volt source of alternating current potential.

In accordance with one aspect of the invention, the secondary winding 16 includes two secondary output terminals 30 and 36 across which a resonating capacitor 18 is attached. The circuit comprising the resonating capacitor 18 and the secondary winding 16 is roughly tuned to the frequency of the source of alternating current potential, in this case 60 cycles per second. If an output voltage of 9,000 or 12,000 volts is desired, the number of turns on the secondary 16 and the size of the stack 13 are adjusted so that a voltage of approximately 6,000 volts peak-to-peak is developed between the terminals 30 and 36. The size of the stack 13 and the number of turns in the primary winding 14 are such that when the transformer 12 is driven by any voltage within the range of 90 to 120 volts, the magnetic flux path of the secondary winding 16 is fully saturated and develops a relatively constant output voltage of 6,000 volts peak-to-peak between the terminals 30 and 36. While prior workers have found it generally impractical to construct a resonant secondary winding having sufficient turns to generate 9,000 to 12,000 volts peak-to-peak without losing good regulation, the present invention seeks to develop only 6,000 volts peak-to-peak across the secondary winding 16 and is therefore able to limit the length of the secondary winding 16 to the point where resistive loses do not prevent the achievement of a good resonance with the capacitor 18. A separate, resonant secondary winding is therefore not required by the power supply 10.

Figure 4:
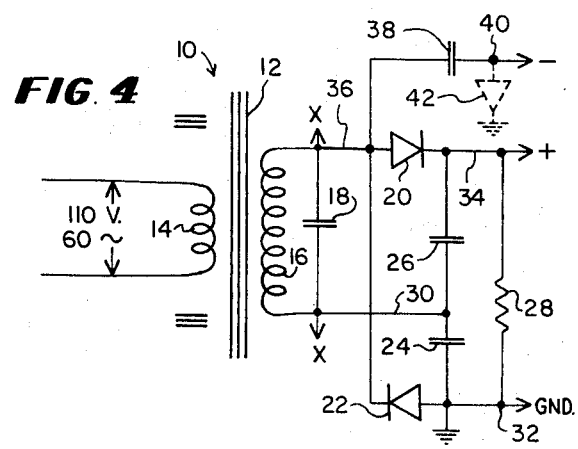
FIG. 4 is a schematic diagram of the power supply shown in FIG. 1.

The secondary terminals 30 and 36 are connected to a voltage doubling rectifier in the manner shown in FIG. 4. A first rectifier 20 has its anode connected to the secondary terminal 36 and its cathode connected to a positive output 34. A second rectifier 22 has its cathode connected to the secondary terminal 36 and its anode connected to a grounded output 32. A first filter capacitor 26 connects the secondary terminal 30 to the positive output 34, and a second filter capacitor 24 connects the secondary terminal 30 to the grounded output 32. A bleeder resistor 28 interconnecting the grounded output 32 and the positive output 34 completes the voltage doubling rectifier configuration. This rectifier develops approximately 6,000 volts at the output 34 positively with respect to the grounded output 32. The two capacitors 24 and 26 are never subjected to more than 3,000 volts peak voltage, and the diodes 20 and 22 are never subjected to more than 6,000 volts peak voltage. The cost of these items is therefore substantially lower than the cost of corresponding items in prior art arrangements. The capacitors and diodes are also smaller in physical size. Smaller capacitance values may be used than in prior art supplies without any increase in the ripple potential between the outputs 32 and 34.

With reference to FIGS. 1 to 3, the components of the power supply 10 are all carefully arranged about the transformer core 12 so as to lie entirely within the smallest rectangular solid which can encompass the transformer core 12 and the windings 14 and 16. The two rectifiers 20 and 22 are mounted adjacent opposite sides of the leg of the transformer core 12 which does not support the windings 14 and 16. The resonating capacitor 18 is positioned within a gap that is defined by the winding 16, the laminations 13, and one leg of the transformer core 12. The two filter capacitors 24 and 26 are mounted flush with the surface of the transformer core 12 between the rectifier 22 and the winding 16, as can best be seen in FIG. 2. The bleeder resistor 28 is also mounted against the transformer core 12. A capacitor 38 whose function is yet to be described is positioned adjacent the side of the transformer core 12 and just above the winding 16. Paper is used wherever necessary as insulation and to separate component leads from the metallic core 12 and from each other. The entire power supply 10 may be impregnated with epoxy to form a rectangular solid package that is as compact as the transformer core 12 and the windings 14 and 16 will allow. The size of this package is about one-third the size of comparable prior art power supply packages. The small size of this package is the result of having fewer laminations in the transformer core 12, having far fewer windings occupying space about the core 12, and having smaller sized diodes and capacitors due to the lower voltages and decreased ripple sensitivity of the supply.

In accordance with another facet of the invention, a high voltage capacitor 38 connects the secondary terminal 36 to a negative output 40 of the power supply. Because the secondary terminal 30 is held at A.C. ground potential by the filter capacitor 24, the secondary terminal 36 of the secondary winding 16 fluctuates at a 60 cycle rate between roughly ground potential and a potential level 6,000 volts positive with respect to ground. The capacitor 38 captures this 6,000 volt peak-to-peak fluctuating potential and supplies this potential to the negative output 40 of the supply 10.

Figure 6:
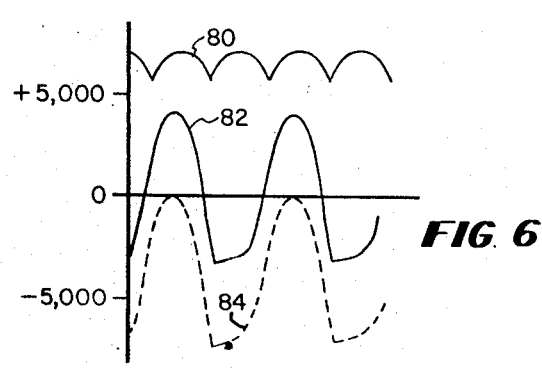
FIG. 6 illustrates the output voltages which are generated by the supply shown in FIG. 1.

With reference to FIG. 6, the voltage at the positive output 34 of the power supply 10 fluctuates approximately as shown at 80 in FIG. 6 at a 120 cycle rate. The A.C. potential which appears at the negative output 40 fluctuates as indicated at 82 in FIG. 6. An examination of FIG. 6 shows that a peak voltage of approximately 9,000 volts is developed between the positive and negative outputs once every one-sixtieth of a second. While the supply output voltage has a very large ripple component at 82 which amounts to about 6,000 volts peak-to-peak, this ripple component does not affect the operation of an electrostatic copier or dust precipitator and can be desirable in that it tends to suppress the formation of arcs. Some evidence exists that large ripple components produce a more uniform charge distribution on the image recording surface than can be produced by steady D.C. voltages without ripple.

A higher output voltage may be achieved by connecting a rectifier 42 (FIG. 4) between the negative output 40 and the ground output 32 with the anode of the rectifier 42 connected to the negative output 40. The rectifier 42 causes the voltage at the node 40 to appear as shown at 84 in FIG. 6, and thus adds about 3,000 volts to the peak output voltage developed by the power supply 10. If it is desired to eliminate the ripple component from the voltage appearing at the negative output 40, an additional rectifier-capacitor filter may be serially connected between the output 40 and ground to serve as a negative impulse peak detector. For example, the rectifier 70 and the capacitor 72 shown in FIG. 5 could be connected to the node 40 rather than to the node 58 with the diode 70 reversed in direction. Such a filter would eliminate most of the ripple from the waveform 84 shown in FIG. 6.

One specific embodiment of the present invention might include the following component values:

| | | |
|---|---|---|
| Capacitors 18 and 38 (6,000 volt rating) | microfarads | .002 |
| Capacitors 24 and 26 (3,000 volt rating) | microfarads | .005 |
| Resistor 28 | megohms | 100 |
| Primary winding 14 | turns | 1,300 |
| Secondary winding 16 | turns | 30,000 |

When a power supply containing the above components is supplied with 90 to 120 volts at 60 cycles, a 6,000 volt peak-to-peak voltage is developed across the secondary winding and hence the positive supply node 34 swings to a peak positive value of approximately 6,000 volts D.C. while the negative output terminal 42 swings to a peak negative value of approximately 3,000 volts. The power supply peak D.C. output voltage is then about 9,000 volts. If an additional rectifier 42 is added as shown in FIG. 4, the power supply output peak voltage is increased to about 12,000 volts.

Figure 5:
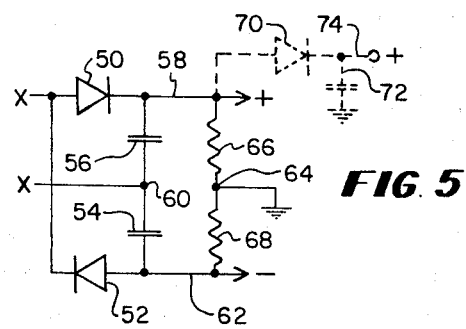
FIG. 5 is an alternate version of a rectifier circuit suitable for use in conjunction with the power supply shown in FIG. 1.

A modified embodiment of the present invention is shown in FIG. 5. Power input for this embodiment comes from the terminals XX in FIG. 4 with all of the components in FIG. 4 removed from the nodes 30 and 36 except for the resonating capacitor 18. The modified embodiment of the invention includes a voltage doubling rectifier constructed from components 50, 52, 54, and 56. This rectifier is essentially identical to the rectifier shown in FIG. 4 which includes the components 20, 22, 24, and 26. The major difference between the two configurations is that neither the positive output 58 nor the negative output 62 of the modified supply is grounded. Two bleeder resistors 66 and 68 connect the outputs 58 and 62 to a ground node 64 and thus force the output 58 to a level positive with respect to ground and the output 62 to a level negative with respect to ground. In order to obtain as large a voltage as is generated by the circuit shown in FIG. 4, the configuration in FIG. 5 requires a transformer core 12 that is three-fourths inch thick and also requires a slightly thicker stack of shunt laminations 13. Excessive ripple which may appear at the positive output 58 may be reduced by means of a simple filter configuration comprising a rectifier 70 and a capacitor 72 connected to a new positive output 74, as is shown in FIG. 5. The following component Values might be used in the construction of this circuit:

Capacitors 54 and 56 (5,000 volt rating)

| | | |
|---|---|---|
| | microfarads | .01 |
| Resistor 66 | million ohms | 7.9 |
| Resistor 68 | million ohms | 100 |

A power supply constructed in accordance with FIG. 5 might reasonably be expected to deliver between 10,000 to 12,000 volts of D.C. peak output potential.

While only two embodiments of the invention have been described, it will be understood that numerous modifications and changes will occur to those skilled in the art. The appended claims are therefore intended to cover all such modifications and changes as come within the true spirit and scope of the invention.

What is claimed as new and desired to be secured by Letters Patent of the United States is:

1. A high-voltage, direct-current power supply designed to operate on a non-regulated source of alternating current potential; said power supply comprising:
   a rectangular stack of laminations forming a transformer core having a central opening;
   a stack of laminations creating a magnetic flux path across the opening in said stack to form a figure-eight shaped transformer core having first and second central openings;
   a single primary winding encircling one leg only of said rectangular stack so as to pass through said first central opening;
   a single secondary winding encircling the same one leg of the rectangular stack so as to pass through said second central opening, said secondary winding having first and second secondary terminals;
   said primary winding having first and second primary terminals connecting to the non-regulated source of alternating current potential, and said primary winding having sufficient turns so as to saturate the flux path of said secondary winding when the source of alternating current potential is supplying the lowest potential which is to be expected;
   a first capacitor connected across said secondary terminals to produce resonance in said secondary winding at approximately the frequency of the non-regulated source;
   a rectifier circuit including rectifying diodes and capacitors having a pair of alternating current input terminals connected to said secondary terminals and having a pair of direct current output terminals;
   said capacitor and the elements of said rectifier circuit lying adjacent to legs of said rectangular stack which legs are not encircled by said primary and secondary windings so as to lie primarily within the bounds of the smallest rectangular solid which can contain the transformer core and the windings; and
   a protective substance surrounding all of the above elements so as to encapsulate the entire power supply.

2. A power supply in accordance with claim 1 wherein the rectifier circuit includes two rectifiers which are positioned on opposite sides of a leg of the rectangular stack which leg is not encircled by said primary and secondary windings, and wherein the rectifier circuit also includes two capacitors which are each positioned between said secondary winding and one of said rectifiers and which are both oriented parallel to the flattest sides of the transformer stacks.

3. A power supply in accordance with claim 1 wherein the first capacitor is positioned in said central opening between said secondary winding and a leg of the rectangular stack.

4. A power supply in accordance with claim 1 to which is added a bleeder resistor connected across the direct current output terminals and positioned to lie essentially within said smallest rectangular solid.

5. A power supply in accordance with claim 1 to which is added a pair of resistors connecting said direct current output terminals to ground and positioned to lie essentially within said rectangular solid, whereby positive and negative output voltages with respect to ground may be obtained.

6. A power supply in accordance with claim 5 to which is added a rectifier and filter stage comprising a diode and a capacitor connected between one of said direct current output terminals and ground, whereby a reduction in the power supply ripple is achieved.

7. A power supply in accordance With claim 1 to which is added a second capacitor having one terminal connecting to one of said secondary terminals, said one secondary terminal being the secondary terminal which is not at the same A.C. potential as said direct current output terminals, and said second capacitor having a second terminal which is a third direct current output terminal.

8. A power supply in accordance with claim 7 which includes a diode interconnecting said third direct current output terminal with a given one of the other two direct current output terminals.

9. A power supply in accordance with claim 8 which includes a rectifier and a third capacitor connected serially between said third direct current output terminal and the given one of the other two direct current output terminals with the rectifier adjacent said third direct current output terminal and oriented so that the third direct current output terminal connects to the cathode of one rectifier and to the anode of another rectifier.

10. A high-voltage, direct-current power supply for operation on a non-regulated source of alternating current potential; said power supply comprising:
    a rectangular stack of laminations forming a transformer core having a central opening;
    a stack of laminations creating a magnetic flux path across the opening in said rectangular stack of laminations to form a figure-eight shaped transformer core having first and second central openings;
    a single primary winding encircling one leg of said rectangular stack so as to pass through said first central opening;
    a single secondary winding encircling one leg of said rectangular stack so as to pass through said second central opening, said secondary winding having first and second secondary terminals, and said secondary winding having sufficient turns to develop between said secondary terminals a peak-to-peak potential whose magnitude is between one-half and two-thirds of the desired peak direct current output potential of the supply when the flux path of the secondary winding is driven to saturation;

said primary winding having first and second primary terminals connecting to the non-regulated source of alternating current potential, and said primary winding having sufficient turns so as to saturate the flux path of said secondary winding when the source of alternating current potential is supplying the lowest potential which is to be expected;

a voltage doubling rectifier circuit having a pair of alternating current input terminals connected to said secondary terminals and having a pair of direct current output terminals, said rectifier circuit producing a D.C. potential at said output terminals whose peak magnitude roughly equals the peak-to-peak magnitude generated by said secondary winding; and a first capacitor connected across said secondary terminals to resonate with said secondary winding at approximately the frequency of the non-regulated source of alternating current potential.

11. A power supply in accordance with claim 10 to which is added a second capacitor connecting one of said secondary terminals to a third output terminal, said one secondary terminal being the secondary terminal which is not at the same alternating current potential as said pair of output terminals.

12. A power supply in accordance with claim 11 to which is added a rectifier connecting said third output terminal to one of said pair of direct current output terminals.

13. A power supply in accordance with claim 10 to which is added resistors connecting each of said pair of direct current output terminals to ground.

14. A power supply in accordance with claim 10 wherein the voltage doubling rectifier circuit includes a pair of rectifiers and a pair of capacitors all of which, together with said first capacitor, are positioned close to legs of the rectangular stack of laminations which legs are not encircled by the transformer windings; and all of which are mainly confined to within the smallest rectangular solid which can encompass the transformer core and windings.

15. A power supply in accordance with claim 14 wherein at least one of the power supply capacitors is positioned within the second central opening in the figure-eight shaped transformer core.

16. A high-voltage direct-current power supply comprising a power transformer having primary and secondary windings, means connecting said primary winding to an unregulated source of alternating current potential, a first capacitor connected across said secondary winding to produce resonance in said secondary winding at approximately the frequency of the unregulated source, second and third capacitors connected in series, means connecting one end of said secondary winding to the junction of said second and third capacitors, means including a first rectifier connecting the other end of said secondary winding to said second capacitor, means including a second rectifier connecting said other end of said secondary winding to said third capacitor, thereby to develop across said second and third series connected capacitors a first full wave rectifier output voltage of one polarity, and means including a fourth capacitor connected to said other end of said secondary winding for deriving a second output voltage of the opposite polarity from said first output voltage.

17. The power supply arrangement set forth in claim 16, wherein said second output voltage is an alternating current voltage of a frequency equal to that of said unregulated source.

18. The power supply arrangement of claim 16, which includes a third rectifier connected from said fourth capacitor to ground, thereby to increase the peak amplitude of said opposite polarity second output voltage.

* * * * *